United States Patent
Fries et al.

(10) Patent No.: US 7,802,425 B2
(45) Date of Patent: Sep. 28, 2010

(54) METHOD FOR CONTROLLING OR REGULATING THE AIR PRESSURE IN A COMPRESSED AIR SUPPLY DEVICE

(75) Inventors: Ansgar Fries, Munich (DE); Eduard Hilberer, Hockenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 179 days.

(21) Appl. No.: 12/273,242

(22) Filed: Nov. 18, 2008

(65) Prior Publication Data

US 2009/0133394 A1 May 28, 2009

Related U.S. Application Data

(63) Continuation of application No. PCT/EP2007/004422, filed on May 16, 2007.

(30) Foreign Application Priority Data

May 19, 2006 (DE) ........................ 10 2006 023 681

(51) Int. Cl.
*B60K 25/00* (2006.01)
*B60T 17/02* (2006.01)
(52) U.S. Cl. ............................ 60/329; 60/327; 417/223
(58) Field of Classification Search .................. 60/327, 60/329, 409; 417/18, 223
See application file for complete search history.

(56) References Cited

U.S. PATENT DOCUMENTS 5,114,315 A * 5/1992 Kaltenthaler et al. .......... 417/18

| 5,639,224 A | 6/1997 | Schlossarczyk et al. |
| 6,089,831 A | 7/2000 | Bruehmann et al. |
| 6,540,308 B1 * | 4/2003 | Hilberer ............... 303/6.01 |
| 7,513,576 B2 * | 4/2009 | Hilberer ............... 303/6.01 |

FOREIGN PATENT DOCUMENTS

| DE | 39 23 882 A1 | 9/1990 |
| DE | 43 22 210 A1 | 1/1995 |
| DE | 195 15 895 A1 | 10/1996 |
| DE | 196 20 851 A1 | 12/1997 |
| EP | 1 479 584 A1 | 11/2004 |

OTHER PUBLICATIONS

International Search Report dated Aug. 21, 2007 w/English translation (four (4) pages).

* cited by examiner

*Primary Examiner*—Thomas E Lazo
(74) *Attorney, Agent, or Firm*—Crowell & Moring LLP

(57) ABSTRACT

A method is provided for controlling and/or regulating the air pressure in a compressed air supply device for a utility vehicle. At least one pressure value in the compressed air supply device and/or in vehicle components connected to the compressed air supply device is recorded. A humidity value representing the humidity content in an air filter unit associated with the compressed air supply device is determined. A clutch connecting a drive to a compressor is opened. A discharge valve of the compressed air supply device is opened when the pressure value is above a predetermined minimum value and the humidity value exceeds a predetermined threshold value. The clutch is opened and the discharge valve remains closed when it is indicated that the clutch can be engaged, the pressure value reaches a predetermined cutting-off pressure, and the humidity value is below the predetermined threshold value.

14 Claims, 4 Drawing Sheets

METHOD FOR CONTROLLING OR REGULATING THE AIR PRESSURE IN A COMPRESSED AIR SUPPLY DEVICE

CROSS-REFERENCE TO RELATED APPLICATIONS

This application is a continuation of PCT International Application No. PCT/EP2007/004422, filed May 16, 2007, which claims priority under 35 U.S.C. §119 to German Patent Application No. DE 10 2006 023 681.5, filed May 19, 2006, the entire disclosures of which are herein expressly incorporated by reference.

This application contains subject matter related to U.S. application Ser. Nos. 12/273,382, 12/273,388, and 12/273,255, entitled "Compressed Air Supply System for a Utility Vehicle," "Compressed Air Supply System for a Utility Vehicle," and "Compressed Air Supply Device for a Utility Vehicle," respectively, all filed on an even date herewith.

BACKGROUND AND SUMMARY OF THE INVENTION

The present invention relates to a method for controlling and/or regulating the air pressure in a compressed air supply device for a utility or commercial vehicle, with the steps: detection of at least one pressure value in the compressed air supply device and/or in vehicle components connected to the compressed air supply device, determination of a moisture value which represents the moisture content in an air filter unit belonging to the compressed air supply device, and opening of a shiftable clutch connecting a drive to a compressor, and also opening of a discharge valve of the compressed air supply device when the pressure value lies above a predetermined minimum value and the moisture value overshoots a predetermined threshold value.

The invention relates, furthermore, to a compressed air supply device and to a utility vehicle having a compressed air supply device.

Compressed air supply devices are of a central importance for utility vehicles. In particular, the brake system of a pneumatically braked utility vehicle requires compressed air, as do numerous further consumers, for example air suspensions or lift axle devices. The compressed air to be prepared and distributed by the compressed air supply device is delivered by a compressor which is driven, in general, by the internal combustion engine of the utility vehicle. In a commonly accepted concept in this regard, the compressor is coupled to the internal combustion engine via a pneumatically shiftable clutch, the compressed air for the pneumatic activation of the clutch being extracted, in turn, from the compressed air supply device. An example of a device of this type is given in DE 3923882 C2.

Owing to the shiftability of the clutch, the operation of the compressor can be interrupted, as required, for example during the regeneration phases of the filter unit. With the clutch being opened, a conveyance of air through the filter unit in the direction of the consumer is interrupted while a regeneration of the filter unit is taking place, wherein dry air is conducted out of the reservoirs through the filter unit in the opposite direction. The dry air absorbs the moisture and can then escape via a discharge valve. Irrespective of the need for regeneration, the discharge valve is also opened when the pressure prevailing in the compressed air supply device reaches a maximum value. Functionality as a pressure controller is thereby made available by the compressed air supply device. One disadvantage to be noted in this regard is that any action of the pressure controller entails compressed air losses via the discharge valve and other switching losses related to the electrical, electropneumatic and pneumatic valves.

The object on which the invention is based is to make available a method having an improved energy balance with regard to the pressure controller function.

The invention builds on the generic method in that the clutch is opened and the discharge valve remains closed when it is indicated that the clutch can be engaged, the pressure value reaches a predetermined switch-off pressure and the moisture value lies below the predetermined threshold value. On the basis of the shiftability of the clutch between the internal combustion engine and compressor, the clutch can assume the pressure controller function independently of the discharge valve. When the pressure reaches the switch-off pressure, the clutch is opened with minimal compressed air consumption, whereas the discharge valve remains closed in order to avoid considerably higher compressed air losses. The discharge valve has to be opened only when regeneration is actually necessary, as can be detected by the overshooting of a moisture threshold value. Particularly when the vehicle is in an operating mode with low air consumption, a high degree of energy saving can thereby be achieved, as compared with pressure control via the discharge valve, since, with a low air consumption, the filter unit has to be regenerated only rarely. The discharge valve can to that extent remain closed while pressure control is nevertheless taking place via the shiftable clutch. By contrast, in the case of a high compressed air consumption, frequent regeneration will have to be carried out, and therefore the switching frequency of the switch-off valve rises. Thus, whereas, in the case of low air consumption, the energy saving takes place, in particular, on account of the long opening durations of the clutch and pressure control solely via the clutch, in the case of high air consumption the energy saving is made available, in particular, by means of directed regeneration when the moisture threshold value is reached. The moisture content in the air filter unit can be measured or calculated.

In the case of calculation of the moisture value, there is provision for the moisture value to be calculated, taking into account the conveyed air volume and the efficiency of the air filter unit. The conveyed air volume can be calculated from the characteristic data of the compressor and from the rotational speed of the compressor. The moisture content is then obtained by summing or integrating the calculated moisture contributions over time.

There may likewise be provision for the decrease in the efficiency of the air filter unit with the running time of the air filter unit to be taken into account in the calculation of the moisture value. Without the running time behavior being taken into account, an efficiency which is actually too low is assumed in the case of a new air filter unit. With the running time behavior being taken into account, the interval between the regeneration phases, particularly in the case of a new filter unit, can be increased considerably, thus leading to an additional energy saving.

For comparable reasons, it is expedient that the temperature of the surroundings is taken into account in the calculation of the moisture value. Warm air, as a rule, stores more water than cold air. If a temperature-dependent correcting factor is defined and if the correcting factors determined on the basis of this definition are adopted in the summation or integration for determining the moisture content of the air filter unit, then the average time between the regeneration phases can be further prolonged, particularly in winter.

According to a preferred embodiment of the invention, there is provision for the clutch to remain closed and for the discharge valve to be opened when the shiftability of the clutch is not afforded on account of a defect, the pressure value reaches a predetermined switch-off pressure and the moisture value lies below the predetermined threshold value. Conventional pressure control via the discharge valve thus offers a substitute function for the primarily employed pressure control via the shiftable clutch.

There is expediency provision for the at least one pressure value and the moisture value to be detected by an electronic control. The pressure control function can thus take place by means of the electronic control on the basis of the determined values, preferably taking into account other parameters relating to the compressed air supply system or, in general, to the vehicle.

According to a particularly advantageous embodiment of the invention, there is provision for the electronic control to be integrated into a compressed air preparation plant. This can be implemented, in practice, in that the conventional electronic control of the compressed air preparation plant is extended to include the functionality of clutch activation.

It is also conceivable, however, that the electronic control communicates via an interface with a control integrated into a compressed air preparation plant. On this basis, the conventional electronic control of the compressed air preparation plant can remain largely unchanged, and the shift functionality for the clutch can be available externally.

Furthermore, there may be provision for the at least one pressure value to be detected by a pressure switch which, when the switch-off pressure is reached, generates an electrical signal for opening the clutch. Such a pressure switch may assume sole management by pressure control or act redundantly to pressure control by the electronic control. In this case, the electrical signal generated by the pressure switch may be supplied directly to an electrically switchable valve for the pneumatic activation of the clutch or to the electronic control, so that the latter makes available the electrical signal for the pilot control of the pneumatic valve.

The invention relates, furthermore, to a compressed air supply device for carrying out a method according to the invention and to a utility vehicle having a compressed air supply device according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the drawings, the same reference symbols designate identical or comparable components.

Figure 1:
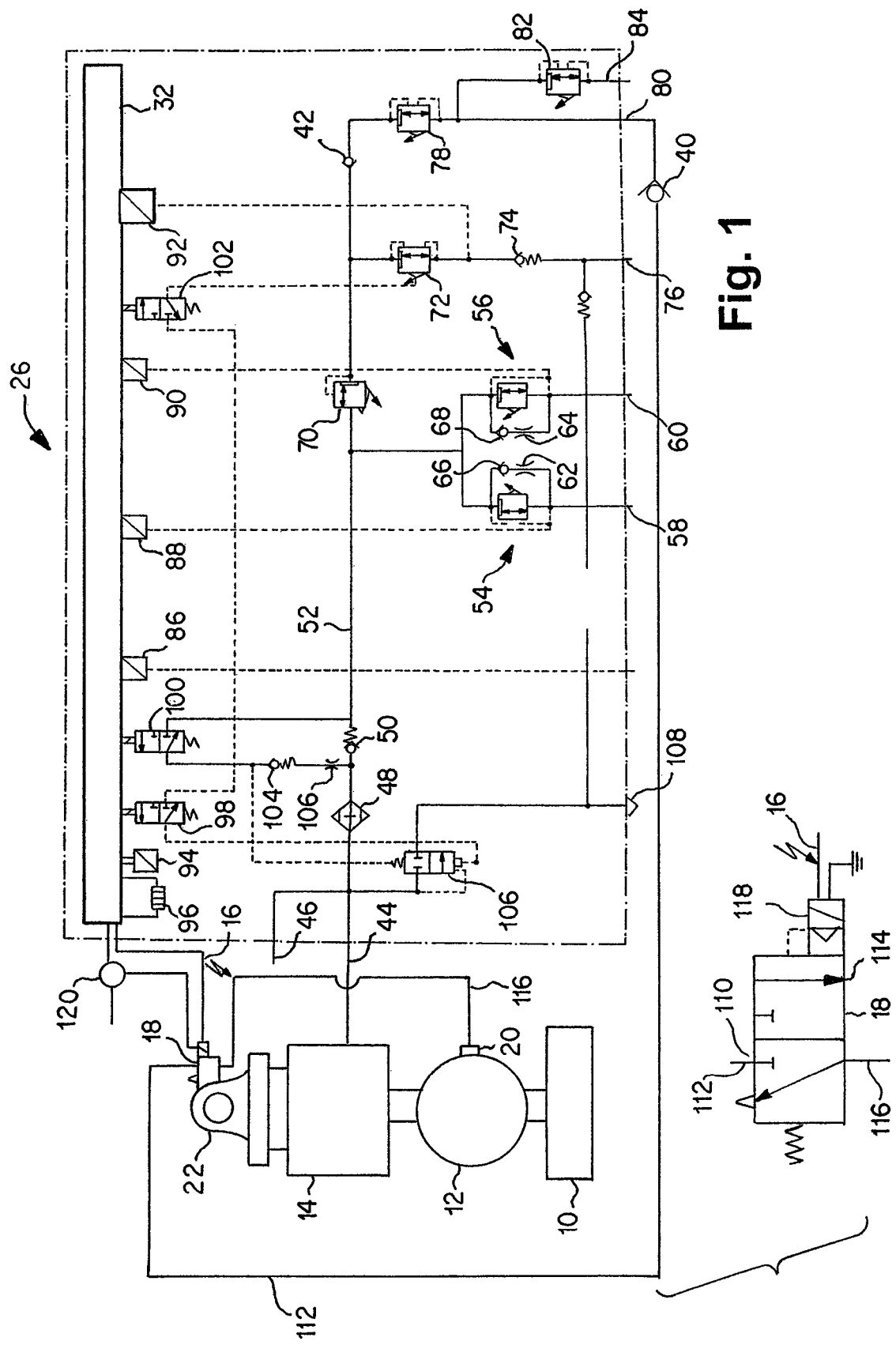
FIG. 1 shows a diagrammatic illustration of a compressed air supply device according to the invention.

FIG. 1 shows a diagrammatic illustration of a compressed air supply device according to the invention. A compressed air preparation plant 26 is illustrated. By means of this, compressed air supplied is filtered and is distributed to various compressed air consumers. An inlet connection 44 is provided, which is connected to a compressor 14 provided outside the compressed air preparation plant 26. An extraneous filing connection 46 is arranged parallel to the inlet connection 44. The compressed air supplied to one of the inlets 44, 46 is supplied to a filter unit 48 and from there, via a nonreturn valve 50, to a main supply line 52. Arranged in parallel on the main supply line 52 are two overflow valves 54, 56, via which connections 58, 60 for the service brake circuits of the utility vehicle are supplied with compressed air. A throttle 62, 64 and a nonreturn valve 66, 68 are arranged in each case parallel to the overflow valves, according to the present embodiment a flow, parallel to the flow through the overflow valves 54, 56, from the main supply line 52 to the connections 58, 60 of the service brake circuits being made possible. As a result, particularly during the refilling of the system, even in the case of low pressures in the main supply line 52, an early filling of the service brake circuit reservoirs can take place. It is likewise possible to provide the nonreturn valves in the opposite direction, this refilling benefit being dispensed with. A refilling of secondary consumers from the reservoirs of the service brake circuits is then made possible as a result. Furthermore, a pressure limiter 70 is provided in the main supply line 52. Two further lines branch off in parallel on the pressure-limited side of the pressure limiter 70, a connection 76 for the parking brake and the trailer brake system being supplied by means of one line via an overflow valve 72 and a nonreturn valve 74. The other line, via a nonreturn valve 42 and an overflow valve 78, feeds a connection 80 which is provided for actuating the compressor clutch 12. The overflow valve 78 is followed in a branching-off line by a further overflow valve 82 via which a further secondary consumer connection 84 is supplied.

A plurality of pressure sensors 86, 88, 90, 92 are connected to the electronic control 32, the pressure sensor 88 measuring the pressure at the service brake connection 58, the pressure sensor 90 measuring the pressure at the service brake connection 60 and the pressure sensor 62 measuring the pressure directly downstream of the overflow valve 72 for the connection 76 of the parking brake and trailer. Furthermore, a temperature sensor 94 and a heating 96 are connected to the electronic control 32. Moreover, three solenoid valves 98, 100, 102 are connected to the electronic control 32: the pressure controller solenoid valve 98, the regeneration solenoid valve 100 and a solenoid valve 102 for the additional pressure control of the overflow valve 72. The solenoid valves 78, 100, 102 are designed as 3/2-way valves and are all closed in the currentless state. In the closed state, the pressure of the main supply line 52 is present at the inputs of the solenoid valves 98, 100, 102. To initiate a regeneration operation, it is necessary to apply current to the regeneration solenoid valve 100 and the pressure controller solenoid valve 98 and thus transfer them into their state not illustrated. The result of this is that dry compressed air is extracted from the service brake reservoirs via the main supply line 52 and then, bypassing the nonreturn valve 50, flows through the filter unit 48 in the opposite direction via the regeneration solenoid valve 100, a further nonreturn valve 104 and a throttle 106, in order then to flow via a discharge valve 106, changed over into its switching position, not illustrated on account of the changeover of the pressure controller solenoid valve 98, to a discharge 108 and from there out into atmosphere. The compressor 14 already mentioned, an internal combustion engine 10 and a shiftable clutch 12 connecting the compressor 14 to the internal combustion engine 10 are illustrated outside the compressed air preparation plant 26. The compressor 14 has an intake connection piece 22, via which the air to be compressed is sucked in. In the region of this air supply, a 3/2-way valve 18 is arranged, which in the present case is designed as an electrically pilot-controlled pneumatic valve, as is also illustrated separately. The pneumatic valve 18 has an inlet connection 110 to which a line 112 leading to the clutch connection 80 is connected. In this line 112, a nonreturn valve 40 is arranged, which permits a flow from the clutch connection 80 to the valve 18 and prevents a reverse flow. The valve 18 has an outlet connection which is coupled to a shift input 20 of the clutch 12 via a line 116. Via an electrical input 118 for the purpose of supplying a signal 16, the valve is connected to the electronic control 32 of the compressed air preparation plant 26 and to a ground which is picked off at a central plug 120.

The compressed air supply device according to FIG. 1 operates as follows in terms of the shiftable clutch 12. When the clutch 12, closed in the non-pressure-activated state, is to be opened, the electronic control 32 sends an output signal 16 to the electrically pilot-controlled pneumatic valve 18. The valve 18 opens, and a connection is thereby made between the clutch connection 80 of the compressed air preparation plant 26 and the shift input 20 of the clutch 12. As a result of the pneumatic activation of the shift input 20, the clutch 12 is opened. When a regeneration of the filter unit 48 is to take place, the pressure controller solenoid valve 98 and the regeneration solenoid valve 100 are changed over, so that the discharge valve 106 opens and dry air can flow out of the consumer-side reservoirs in the opposite direction through the filter unit 48, the discharge valve 106 and the discharge 108 into the open. If regeneration is not required, however, the solenoid valves 98, 100 remain in the closed state. The opening of the clutch 12 then alone assumes the pressure controller function. To close the clutch 12, the application of current to the electric input 118 is discontinued again, so that the shift input 20 is vented. A short switching time is ensured by means of the nonreturn valves 40, 42. The nonreturn valve 42 prevents a backflow of compressed air out of the line 112 in the direction of the branches of the service brake connections 58, 60 and the connection for the parking brake and the trailer. The nonreturn valve 40 additionally prevents a backflow out of the line 112 to the secondary consumer connection 84. Depending on the design of the plant and the requirements as regards the switching time, one of the nonreturn valves 40, 42 may be sufficient. The nonreturn valves 40, 42 thus ensure that a certain pressure level can always be maintained in the intact line 112, so that, during the changeover of the valve 18, a rapid pressure build-up at the shift input 20 of the compressor 14 is ensured. An additional reservoir in the region of the line 112, by means of which reservoir the maintaining of such a pressure level could likewise be ensured, is therefore unnecessary.

Figure 2:
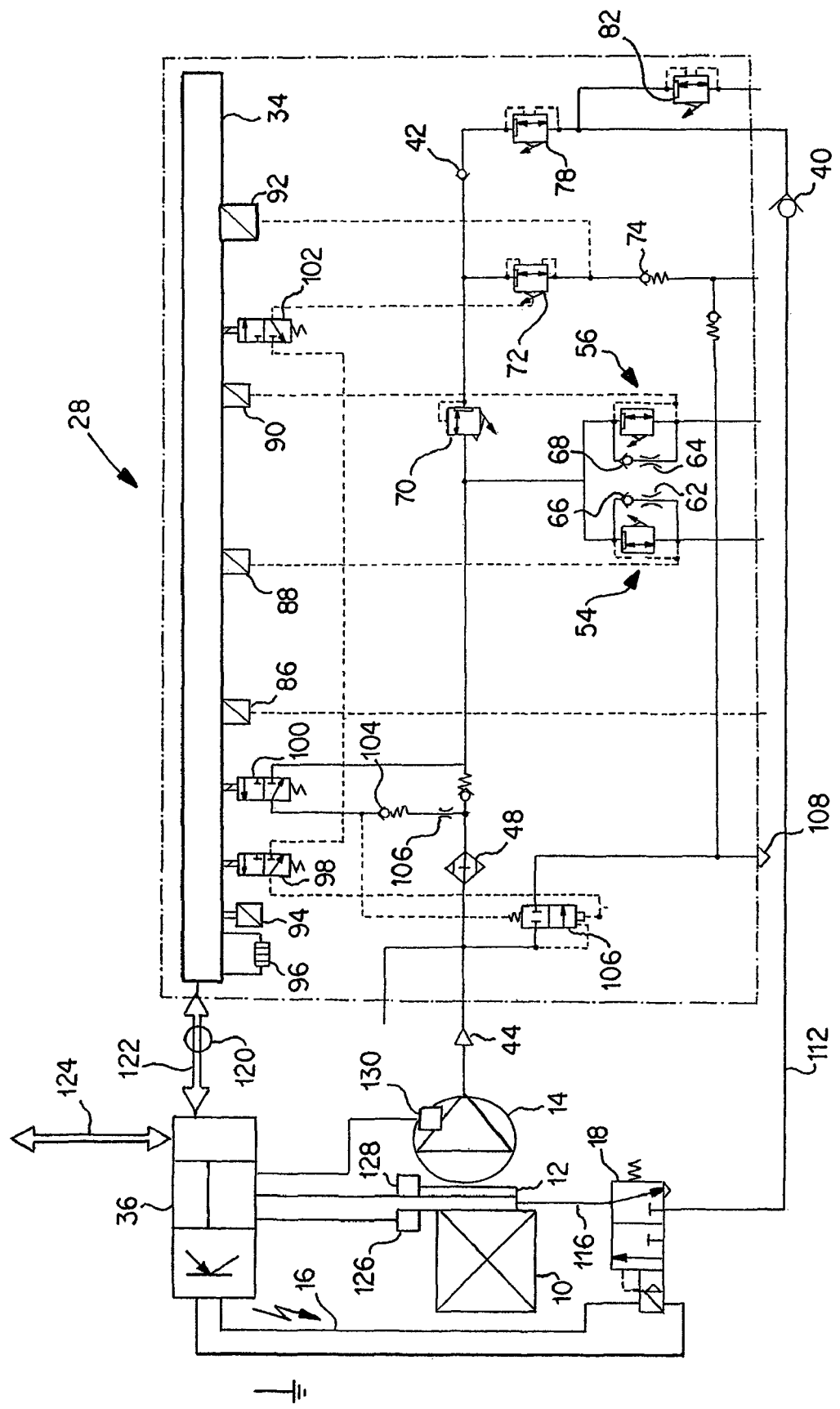
FIG. 2 shows a diagrammatic illustration of a compressed air supply device according to the invention.

FIG. 2 shows a diagrammatic illustration of a compressed air supply device according to the invention. Many properties of the embodiment according to FIG. 2 are identical to the embodiment according to FIG. 1, for example also the preferred arrangement of the electrically pilot-controlled pneumatic valve 18 in the region of the air inlet of the compressor 14, even though this is not illustrated here. In contrast to the embodiment according to FIG. 1, in the embodiment according to FIG. 2 an external control 36 is provided, in addition to the electronic control 34, in the compressed air preparation plant 28. The external control 36 is suitable for communicating with the internal control 34 via an interface 122 which is preferably made available by the central plug 120. An interface 124 with other vehicle components is likewise provided, for example with a vehicle management computer via a CAN bus. The interfaces 122, 124 may be combined in structural terms. Furthermore, it is shown in FIG. 2 that a rotational speed sensor 126 may be arranged on the input side of the clutch 12 and a further rotational speed sensor 128 may be arranged on the output side of the clutch 12. Moreover, a temperature sensor 130 is provided on the compressor 14. The signals from the sensors 126, 128, 130 are delivered to the external control 36 and are taken into account by the latter with regard to the activation of the valve, or are evaluated in another way, for example with regard to function monitoring, and/or are transferred in original or processed form via the interfaces 122, 124.

The useful determination of the rotational speeds and of the temperature may also be provided in connection with the embodiment according to FIG. 1, even though this is not illustrated here. The corresponding data are then delivered to the internal control 32 of the compressed air preparation plant 26.

Figure 3:
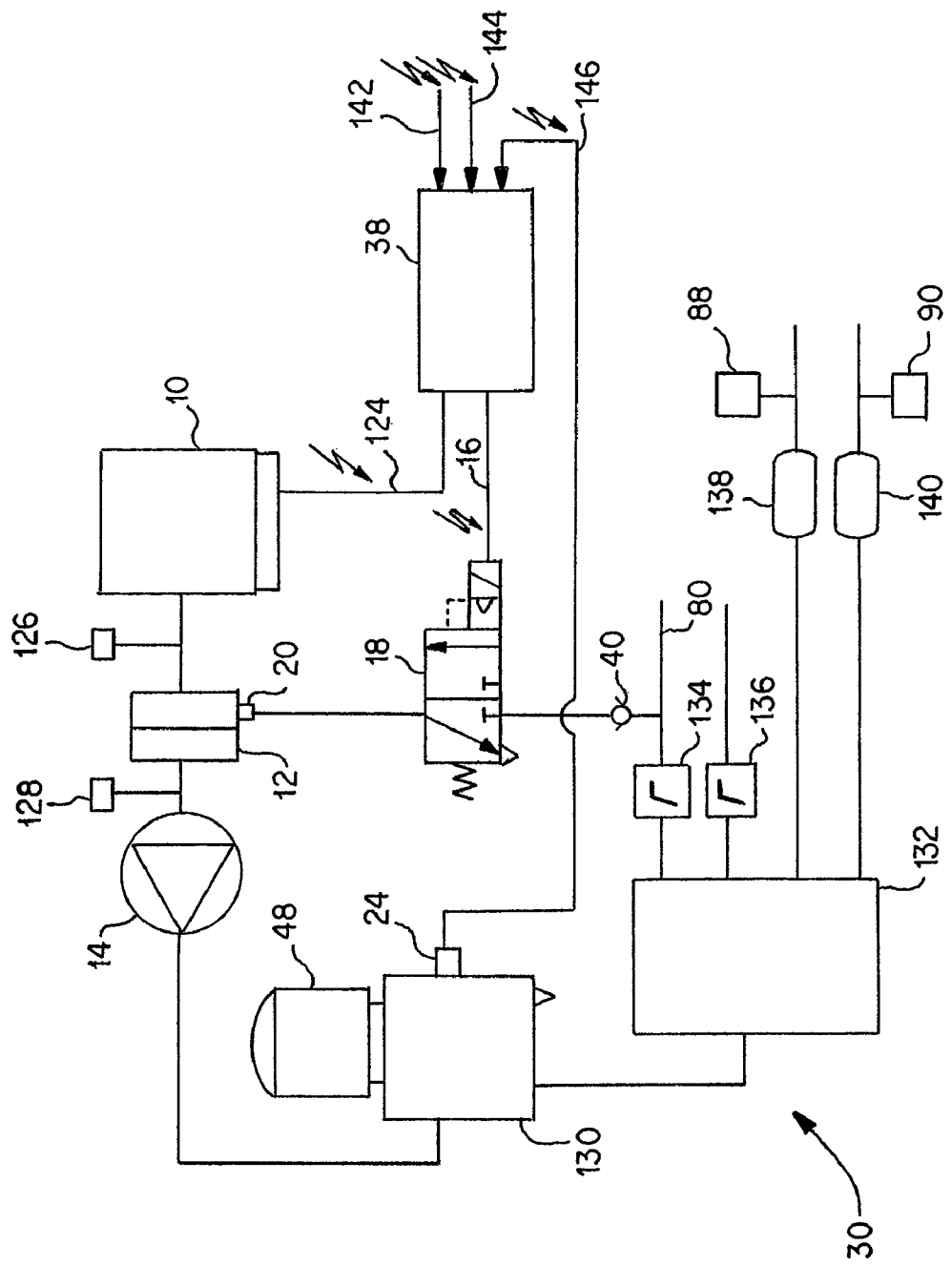
FIG. 3 shows a diagrammatic illustration of a compressed air supply device according to the invention.

FIG. 3 shows a diagrammatic illustration of a compressed air supply device according to the invention. The compressed air supply device illustrated here is illustrated in the form of a plurality of distributed individual subassemblies. In particular, a pressure controller 130 with an attached filter unit 48, a multiple-circuit protection valve 132, pressure limiters 134, 136 and an electronic control 38 are illustrated. The components may in reality be distributed in the way described. However, the distributed illustration may also be understood in the sense of a functional division, the pressure regulator, multiple circuit protection valve, pressure limiters and/or electronic control in reality being implemented in integrated forms, for example as illustrated in connection with FIGS. 1 and 2.

In the embodiment according to FIG. 3, once again, a compressor 14 is coupled to an internal combustion engine 10 via a shiftable clutch 12. The compressor 14 delivers compressed air to the pressure controller 130, from where the compressed air is transferred to the multiple-circuit protection valve 132. The multiple-circuit protection valve 132 distributes the compressed air to the reservoirs 138, 140 and other connections, one of which is illustrated as a connection provided with a pressure limiter 136. A further connection is the clutch connection 80, likewise supplied via a pressure limiter 134. Compressed air is delivered to the electrically pilot-controlled pneumatic valve 18 from the clutch connection 80 via the nonreturn valve 40 ensuring the switching times. The activation of the valve 18 takes place by means of the electronic control 38 which likewise communicates with the internal combustion engine or with an engine control via the interface 124. The electronic control 38 has a plurality of inputs 142, 144, 146. The inputs 142, 144 symbolize the possibility of supplying the control 38 with temperature, pressure and/or rotational speed information, for example measured by the pressure sensors 88, 90 of the service brake circuits and/or by the rotational speed sensors 126, 128 on the input side and the output side of the clutch 12. On the pressure controller 130, a pressure switch 24 is provided. This is connected to the input 146 of the electronic control 38. A pressure-dependent electrical signal can therefore be supplied to the electronic control 38.

The compressed air supply device according to FIG. 3 operates as follows. On the basis of the information made available via the inputs 142, 144, 146 and the interface 124, the electronic control 38 can deliver an electrical signal 16 to the valve 18, so that the latter changes over and opens the clutch 12 by virtue of the ventilation of the shift input 20. The decision to output the signal 16 may then be made on the basis that pressures, temperatures or rotational speeds measured by sensors make it necessary to open the clutch 12. In parallel with this, however, the opening of the clutch may also take place on the basis of the signal output by the pressure switch 24. If components of the embodiment illustrated in FIG. 3 experience a defect, so that, for example, the pressure levels in the service brake circuits are no longer measured reliably, the presence of the pressure switch 24 and of the switch functionality thereby made possible nevertheless makes it possible for the clutch 12 to be opened, thus preventing the destruction of the latter on account of the defects outlined.

In addition to the variant illustrated in FIG. 3, it is likewise possible to supply the output signal from the pressure switch 24 directly to the valve 18, so that, even in the event of a complete failure of the electronic control 38, an opening of the clutch 12 can take place.

Figure 4:
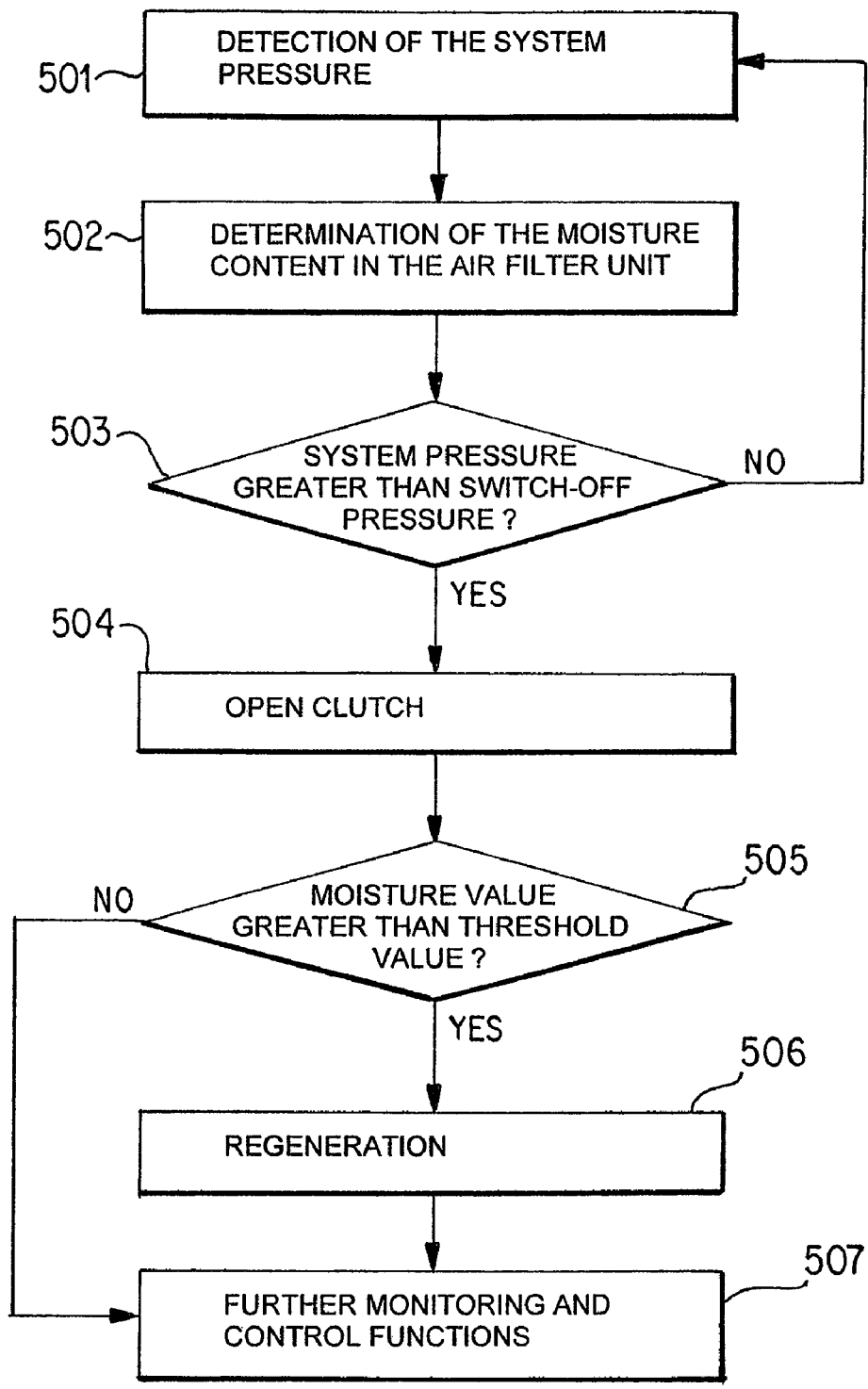
FIG. 4 shows a flow chart for explaining a method according to the invention.

FIG. 4 shows a flow chart for explaining a method according to the invention. In a step S01, the system pressure is detected, for example in the region of the service brake circuits. In a step S02, the moisture content in the air filter unit is determined, either by measurement or by calculation on the basis of the air volume conveyed by the compressor, the compressor rotational speed and the efficiency of the air filter unit. In step S03, it is determined whether the system pressure is higher than a predetermined switch-off pressure. If this is so, in step S04 the clutch is opened. In the opposite case, no opening of the clutch takes place, and the sequence returns to step S01. After the opening of the clutch in step S04, in step S05 a check is made as to whether the moisture value is higher than a predetermined threshold value. If this is so, in step S06 regeneration is initiated. If the moisture value is not higher than the threshold value, further monitoring and control functions may take place according to step S07, just as they can after regeneration according to step S06.

It should be noted that the flow chart according to FIG. 4 illustrates only a partial aspect of the monitoring in terms of the system pressure and the moisture content. For example, a check as to whether the moisture value is higher than the threshold value is also carried out irrespective of whether the switch-off pressure is present. Regeneration is also carried out at lower pressures if the system pressure is higher than the minimum pressure.

TABLE OF REFERENCE SYMBOLS

10 Drive
12 Clutch
14 Compressor
16 Signal
18 Valve
20 Shift input
22 Fresh air supply
24 Pressure switch
26 Compressed air preparation plant
28 Compressed air preparation plant
30 Compressed air preparation plant
32 Electronic control
34 Electronic control
36 Electronic control
38 Electronic control
40 Nonreturn valve
42 Nonreturn valve
44 Input connection
46 Extraneous filling connection
48 Filter unit
50 Nonreturn valve
52 Main supply line
54 Overflow valve
56 Overflow valve
58 Connection service brake circuit
60 Connection service brake circuit
62 Throttle
64 Throttle
66 Nonreturn valve
68 Nonreturn valve
70 Pressure limiter
72 Overflow valve
74 Nonreturn valve
76 Connection parking brake/trailer
78 Overflow valve
80 Connection clutch
82 Overflow valve
84 Connection secondary consumer
86 Pressure sensor
88 Pressure sensor
90 Pressure sensor
92 Pressure sensor
94 Temperature sensor
96 Heating
98 Solenoid valve
100 Solenoid valve
102 Solenoid valve
104 Nonreturn valve
106 Discharge valve
108 Discharge
110 Input connection
112 Line
114 Output connection
116 Line
118 Electrical input
120 Central plug
122 Interface
124 Interface
126 Rotational speed controller
128 Rotational speed controller
130 Pressure controller
132 Multiple-circuit protection valve
134 Pressure limiter
136 Pressure limiter
138 Reservoir
140 Reservoir
142 Input
144 Input
146 Input The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling and/or regulating the air pressure in a compressed air supply device for a utility vehicle, the method comprising the acts of:

detecting at least one pressure value in the compressed air supply device and/or in vehicle components connected to the compressed air supply device;

determining a moisture value indicative of the moisture content in an air filter unit belonging to the compressed air supply device;

opening a shiftable clutch connecting a drive to a compressor, and opening a discharge valve of the compressed air supply device when the pressure value lies above a predetermined minimum value and the moisture value overshoots a predetermined threshold value;

wherein the clutch is opened and the discharge valve remains closed when the clutch is engageable, the pressure value reaches a predetermined switch-off pressure, and the moisture value lies below the predetermined threshold value.

2. The method as claimed in claim 1, wherein the moisture value is calculated, taking into account the conveyed air volume and the efficiency of the air filter unit.

3. The method as claimed in claim 2, wherein the decrease in the efficiency of the air filter unit with the running time of the air filter unit is taken into account in the calculation of the moisture value.

4. The method as claimed in claim 3, wherein the temperature of the surroundings is taken into account in the calculation of the moisture value.

5. The method as claimed in claim 3, wherein the clutch remains closed and the discharge valve is opened when the clutch is not engageable on account of a defect, the pressure value reaches a predetermined switch-off pressure, and the moisture value lies below the predetermined threshold value.

6. The method as claimed in claim 2, wherein the temperature of the surroundings is taken into account in the calculation of the moisture value.

7. The method as claimed in claim 2, wherein the clutch remains closed and the discharge valve is opened when the clutch is not engageable on account of a defect, the pressure value reaches a predetermined switch-off pressure, and the moisture value lies below the predetermined threshold value.

8. The method as claimed in claim 1, wherein the clutch remains closed and the discharge valve is opened when the clutch is not engageable on account of a defect, the pressure value reaches a predetermined switch-off pressure, and the moisture value lies below the predetermined threshold value.

9. The method as claimed in claim 1, wherein the at least one pressure value and the moisture value are detected by an electronic control.

10. The method as claimed in claim 9, wherein the electronic control is integrated into a compressed air preparation plant.

11. The method as claimed in claim 9, wherein the electronic control communicates via an interface with a control integrated into a compressed air preparation plant.

12. The method as claimed in claim 1, wherein the at least one pressure value is detected by a pressure switch which, when the switch-off pressure is reached, generates an electrical signal for opening the clutch.

13. A compressed air supply device for a utility vehicle for carrying out the method according to claim 1.

14. A utility vehicle comprising:
a compressed air supply device, the compressed air supply device carrying out the method according to claim 1.

* * * * *